May 7, 1935.  A. R. VAN C. WARRINGTON  2,000,803
ELECTRORESPONSIVE DEVICE
Filed June 11, 1932  3 Sheets-Sheet 1

Inventor:
Albert R. van C. Warrington,
by Charles E. Mullan
His Attorney.

May 7, 1935.   A. R. VAN C. WARRINGTON   2,000,803
ELECTRORESPONSIVE DEVICE
Filed June 11, 1932   3 Sheets-Sheet 2

Inventor:
Albert R. van C. Warrington,
by Charles V. Tullar
His Attorney.

Inventor:
Albert R. van C. Warrington,
by Charles E. Tullar
His Attorney.

Patented May 7, 1935

2,000,803

UNITED STATES PATENT OFFICE 2,000,803

ELECTRORESPONSIVE DEVICE

Albert R. van C. Warrington, Media, Pa., assignor to General Electric Company, a corporation of New York Application June 11, 1932, Serial No. 616,612

12 Claims. (Cl. 175—294)

My invention relates to improvements in electroresponsive devices and more particularly to improvements in relays for controlling electric circuits in response to predetermined circuit conditions and especially fault conditions and an object of my invention is to provide an improved electroresponsive device for obtaining large operating forces and high speed of operation with a low energy consumption. Another object of my invention is to provide an electroresponsive device whose construction is readily adaptable for response to a great variety of electric circuit conditions and is particularly adapted to distance relays. A further object of my invention is to provide an electroresponsive device which is selective in its operation and does not operate on power surges. Other objects of my invention will appear hereinafter.

My invention will be better understood from the following description when considered in connection with the accompanying drawings and its scope will be pointed out in the appended claims.

Figure 1:
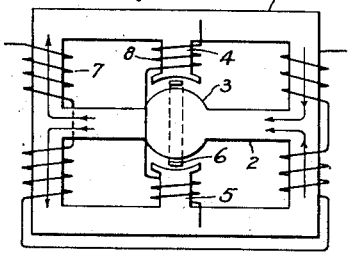
Figure 15:
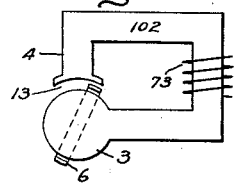
Figure 16:
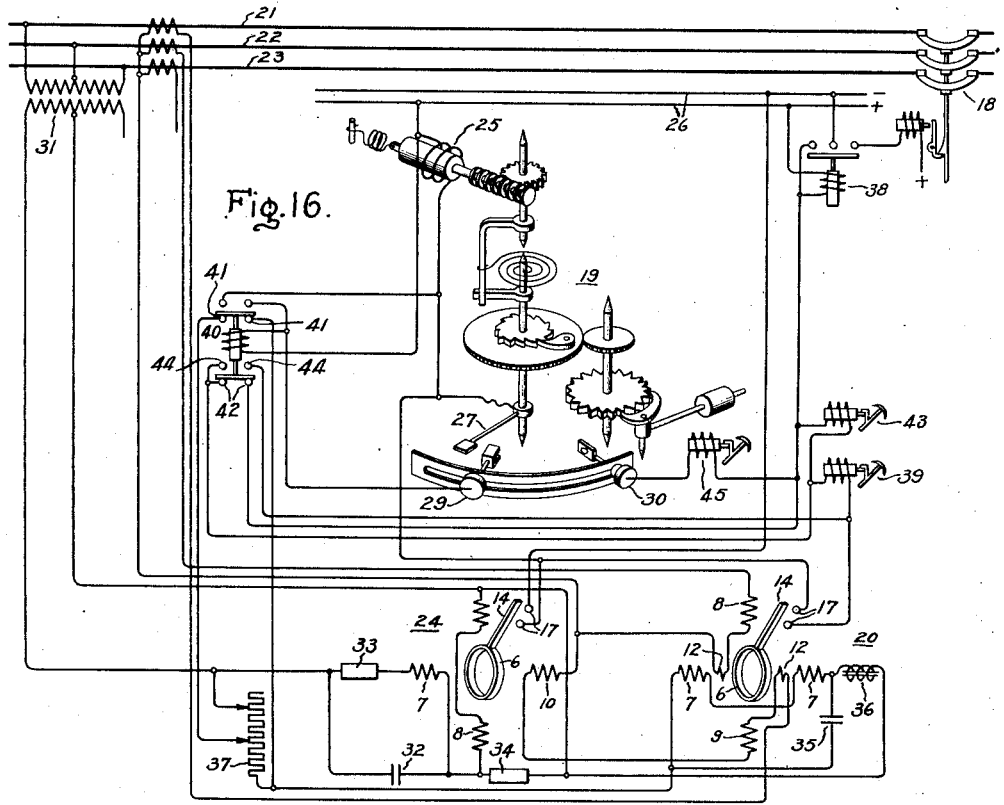
Figure 17:
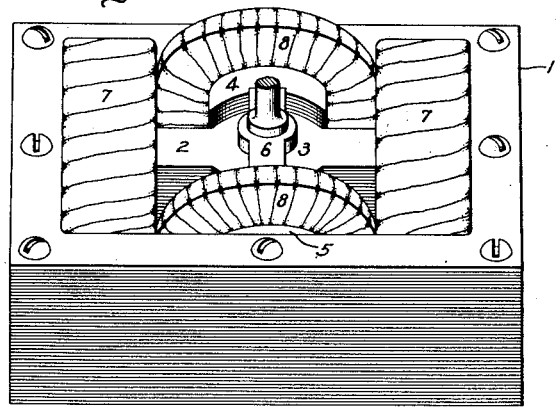
Figure 18:
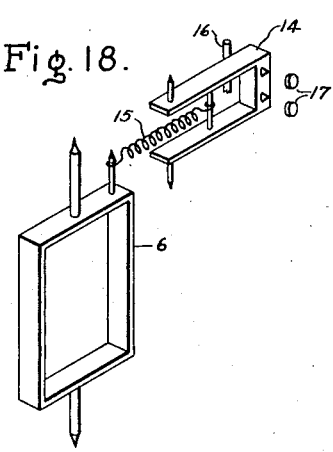
Figure 19:
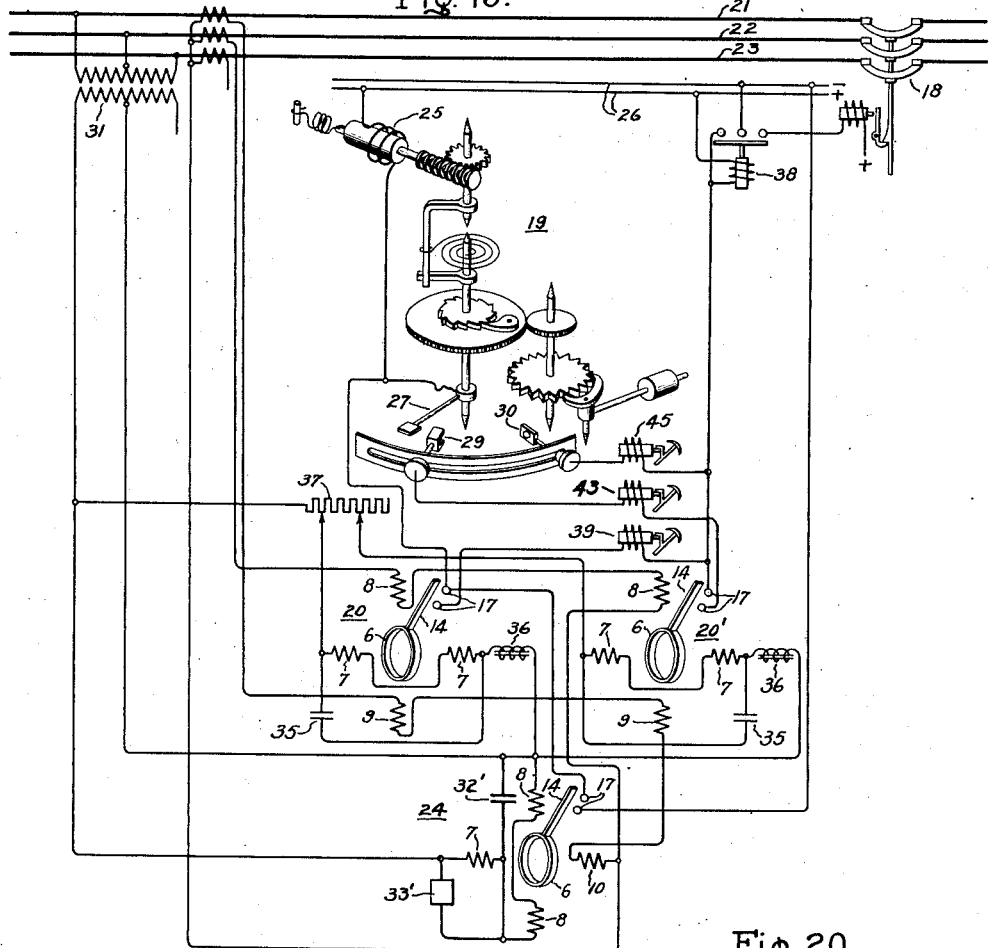
Figure 20:
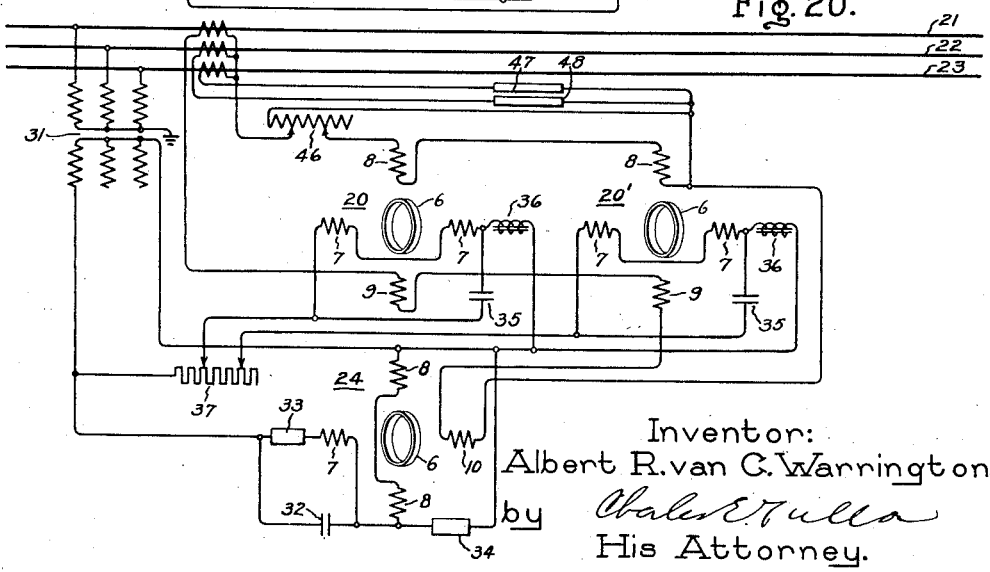

In the accompanying drawings, Fig. 1 illustrates schematically one embodiment of my invention, Figs. 2 to 15 inclusive illustrate schematically other embodiments of my invention, Fig. 16 diagrammatically illustrates an embodiment of my invention in a distance relay, Fig. 17 illustrates in perspective one form of the embodiment of my invention shown in Fig. 1, Fig. 18 illustrates in perspective a contact arrangement for use in relays embodying my invention, and Figs. 19 and 20 illustrate diagrammatically distance relays embodying my invention.

Figure 6:
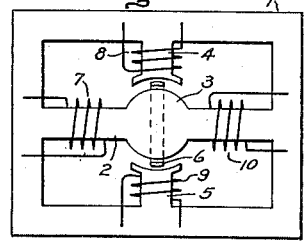

In accordance with my invention, I provide an induction dynamometer construction wherein by transformer action with one or more suitably energized windings the current which is induced in a movable closed-circuit winding coacts with the magnetic flux of one or more other suitably energized windings to produce an operating force for controlling the movement of the closed-circuit winding according to a desired relation between the electric quantities energizing the windings. The operating force may be in the form of a torque, $T$, which is in general represented by the vectorial expression $$T = K_1(\overline{X} - \overline{W})\overline{Y} + K_2(\overline{X} - \overline{W})\overline{Z} + K_3(\overline{Y} - \overline{Z})^2 + K_4(\overline{X} - \overline{W})^2,$$

in which W, X, Y and Z represent electric quantities such as the currents and/or voltages applied to the energizing windings; 10, 7, 8 and 9 as shown in Fig. 6, and $K_1$, $K_2$, $K_3$ and $K_4$ constants dependent on the position of the closed-circuit winding and the symmetry of the construction. This winding may comprise one or more turns and may take the form of a single or a double loop wherein both loops may or may not be coplanar.

Referring now in particular to Figs. 1 and 17, the magnetic structure may take the form of a preferably laminated rectangular-shaped closed loop 1, two opposite sides of which are interconnected by a preferably laminated magnetic member 2 locally enlarged as at 3. Toward this enlargement which may be cylindrical in form, as shown in some of the figures there extend from the other sides of the loop, polar projections 4 and 5 whose pole face configuration for certain applications preferably corresponds to the shape of the enlargement so as to provide uniform annular air gaps. The closed-circuit winding or inductor ring 6 extends around the enlargement and is so mounted as to move freely in the air gaps.

Figure 3:
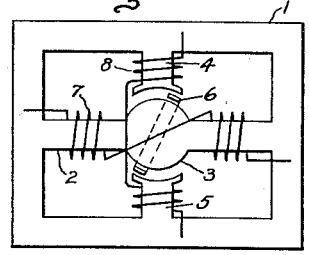

The embodiment of my invention shown in Fig. 1 is particularly well adapted for distance relays since if one of its windings 7, 8 is energized by the line voltage and the other by the line current, the torque T acting on the ring 6 is proportional in scalar form to $$K_1 EI \cos(\phi - \theta) + K_3 I^2 + K_4 E^2,$$

where $K_1$, $K_3$ and $K_4$ are constants dependent upon the construction, E and I line voltage and current respectively, $\phi$ the phase angle between them and $\theta$ an angle dependent on the power factor of the potential coil circuit. $\theta$ is the angle between E and I at which maximum torque is obtained. The constants $K_1$, $K_3$ and $K_4$ can be controlled both as to magnitude and sign in accordance with the relative connections of the windings 7, 8 the position of the ring 6 and the symmetry of construction. Thus, for example, if the windings 7 and 8 are connected to be energized in accordance with line voltage and current respectively when the ring is in the neutral position shown in Fig. 1, then the torque T is a purely directional torque, $K_3$ and $K_4$ having been made substantially zero. By neutral position, I mean the position of the ring where it does not link the fluxes in the air gaps. If $K_4$ is made zero, then $K_3$ can be varied from zero to a maximum value according to the position of the ring 6. By symmetry of construction, that is by having the corresponding halves of winding 7 similar in construction and position on the loop, the air gaps substantially identical and the magnetic joints close fitting, the constant $K_4$ associated with the winding on the core member 2 can be made zero and the value of the other constant $K_3$ varied by the displacement of the ring from the neutral position, as shown in Fig. 3. Also the winding 7 which in Fig. 1 is located on the loop 1 to provide a flux relation as indicated by the arrows is in Fig. 3 mounted on the tie member 2. Consequently, if the windings 7 and 8 are connected to be energized in accordance with the line voltage and current respectively and the ring is displaced as shown in Fig. 3, the resultant torque on the ring will be a directional torque $EI \cos(\phi-\theta)$ combined with an $I^2$ torque since some of the flux due to the current threads the ring. The resultant torque, therefore, has an ohmic characteristic which particularly fits the device as an ohm unit for distance relays. By making $\theta=90°$, the torque becomes dependent on $I^2 - EI \sin\phi$ which provides a reactance ohm unit characteristic. By having symmetry of construction about the axis of the member 2 and the axis of the polar projections 4 and 5 as to distribution of magnetic material, disposition of the winding turns and air gap configuration, a uniform ohmic characteristic can be maintained over a wide range in values of E and I whereby to maintain a substantially uniform circular polar characteristic.

If, on the other hand, the windings 7 and 8 are energized by line current and line voltage respectively, the torque on the ring will again have a directional ohmic characteristic for it will comprise a directional torque and an $E^2$ voltage torque, if the ring 6 is out of the neutral position as shown in Fig. 3, since some of the flux due to voltage threads the conductor ring. This arrangement is, therefore, particularly adapted for starting units of distance relays.

By connecting the windings 7 and 8 of the arrangement shown in Fig. 1 to be energized respectively in accordance with two of the voltages of a three-phase circuit and having the ring 6 in the neutral position, the resultant torque is proportional to $E_1 E_2 \cos(\phi-\theta)$ which, by suitable choice of $\theta$, can be made to provide a torque proportional to the area of the voltage triangle. This arrangement is particularly adapted to polyphase voltage relay operation.

Figure 2:
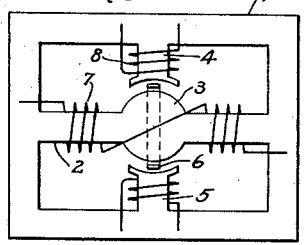

If the winding 8 on the polar projections 4 and 5 instead of being continuous, as shown in Figs. 1 and 3, is divided into two parts 8 and 9 on the projections 4 and 5 respectively, as shown in Fig. 2, and one part is energized by line current and the other by line voltage, the winding 7 is energized by line voltage and the ring is in the neutral position, the resulting torque is proportional to $EI \cos(\phi-\theta) - E^2$, which has a directional ohmic characteristic suitable for the starting units of distance relays.

If the windings 8 and 9 are energized by corresponding currents of two parallel lines, for example, and the winding 7 by a voltage derived from the bus which supplies the lines and the inductor ring is in the neutral position shown in Fig. 2, then the torque is proportional to $$E[I_1 \cos(\phi-\theta) - I_2 \cos(\phi_2-\theta)]$$

where E is the bus voltage, $I_1$ and $I_2$ the line currents, $\phi_1$ and $\phi_2$ phase displacements between the voltage E and the currents $I_1$ and $I_2$ respectively and $\theta$ an angle dependent on the power factor of the circuit of the windings 7.

Figure 4:
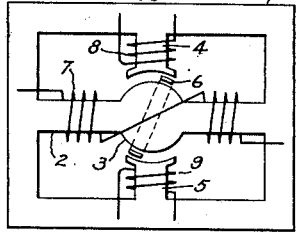

If the winding 8 of the arrangement shown in Fig. 4 is connected to be energized in accordance with the current in a phase conductor of the line, the winding 9 in accordance with the residual current of the line and the winding 7 in accordance with the voltage to ground of the corresponding phase conductor then the torque is proportional to $$(\bar{I}-\bar{I}_0)^2 - E(\bar{I}-\bar{I}_0) \cos(\phi-\theta)$$

where I and $I_0$ represent the phase current and residual current respectively, E the line to ground voltage and $\phi$ the phase angle between $$(\bar{I}-\bar{I}_0)$$

and E. Such an arrangement provides a reactance ohm unit for a ground distance relay.

Figure 5:
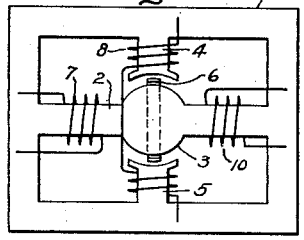

For use either as an ohm unit or a starting unit the $I^1$ or $E^2$ torque may be obtained by separating the winding 7 into two parts 7 and 10, as shown in Fig. 5. If the winding 7 is energized by line voltage and the windings 8 and 10 by line current, then the torque on the inductor ring is proportional to $I^2 - EI \cos(\phi-\theta)$. The device is then adapted for an ohm unit. If the winding 7 is energized by line current and the windings 8 and 10 by line voltage, then the torque on the ring 6 is proportional to $EI \cos(\phi-\theta) - E^2$. The device is, therefore, adapted for use as a starting unit.

Figure 9:
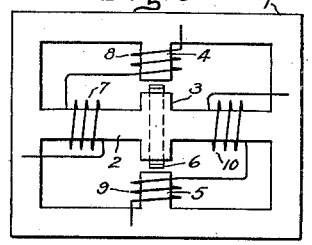

If each of the windings 7 and 8 are separated as shown in Fig. 6 and the windings 7 and 10 are connected to be energized, for example, in accordance with two electric quantities X and W to provide cumulative fluxes while the windings 8 and 9 are energized by two electric quantities Y and Z to provide opposing fluxes and the ring 6 is in the neutral position, the resultant torque on the ring is dependent on $(\bar{X}+\bar{W})(Y-Z)$. In other words, the torque is dependent on the product of the sum of two quantities and the difference between two quantities. So far as my invention is concerned, it is immaterial whether the quantities are currents or voltages and also whether the same quantities are used in connection with the sum as are used in connection with the difference since the general formula for torque also applies here. For example, as shown in Fig. 9, the windings 7 and 8 are interconnected and may be energized by a current of one of two parallel lines while the windings 9 and 10 are interconnected and may be energized by the corresponding current of the other line, the fluxes of windings 7 and 10 being cumulative and the fluxes of windings 8 and 9 opposed. Inasmuch as the resultant torque is dependent on the product of the sum of and the difference between the line currents, the relay is selective in operation in accordance with the balance between the line currents. In certain cases the enlargement 3 of the magnetic member 2 may take a rectangular form as shown in Fig. 9.

Figure 7:
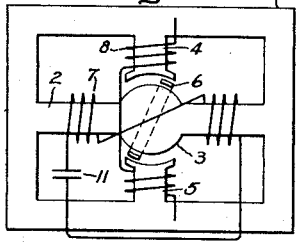

The embodiment of my invention shown in Fig. 7 is a frequency relay. In this relay the inductor ring 6 moves from one position to another in response to a change in frequency of a current or voltage supplied to the winding 8. The winding 7 is connected in circuit with the condenser 11 which is so proportioned relatively to the inductance of the winding 7 that the ring 6 will move in one direction or the other according as the frequency is above or below the desired value.

Figure 8:
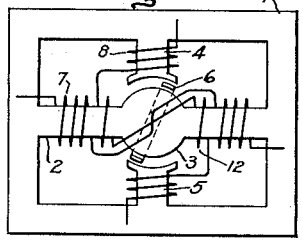

In the embodiment of my invention shown in Fig. 8 a portion 12 of the winding 8 is on the loop member 2 so that the current in this winding may produce in the member a flux which threads the inductor ring 6. In this arrangement it will be obvious that the auxiliary winding 12 is a means for introducing a desired $I^2$ torque when the ring is in the neutral or some intermediate position. This is, in effect, a coarse way to control the desired $I^2$ torque and further refinement can be obtained by suitably controlling the position of the ring. While the above description is given on the basis of line voltage and current in the windings 7 and 8 respectively for the sake of a concrete illustration, it is obvious that, so far as my invention is concerned, it is immaterial what the electric quantities applied to these windings are since the torque controlling effect obtained by placing a portion of the polar projection winding on the cross member 2 can be secured regardless of the electric quantities used to energize the winding.

In the embodiments of my invention shown in Figs. 10–14 inclusive, the magnetic loop 101 may be considered as U-shaped and having the magnetic tie member 2 interconnecting its legs and also having only one polar projection 4 extending toward the enlargement 3.

Figure 10:
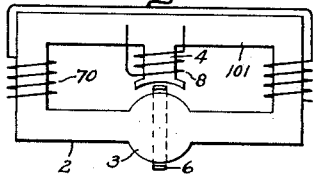

As shown in Fig. 10, the loop 101 is provided with a winding 8 on the polar projection 4 and the winding 70 on the legs of the loop. If the windings 8 and 70 are energized respectively by line current and voltage and the ring 6 is in the neutral position shown, then the relay is a directional relay with a torque proportional to $EI \cos (\phi-\theta)$. If two different phase voltages $E_1$, $E_2$ are applied to the windings 8 and 70 respectively, then the relay constants can be controlled to give a torque proportional to the product of $E_1$, $E_2$ and the function of the phase angle between them, that is proportional to the area of the voltage triangle. If two currents are supplied to the windings 8 and 70, for example the current $I_2$ in the neutral to ground connection of a line and the line residual current I, as summed by the line current transformers, then the torque on the ring is dependent on the product of these currents by a function of the phase angle $\alpha$ between them, for example $I_n I_r \cos(\alpha - \theta)$.

Figure 11:
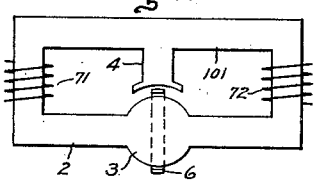

By providing windings 71, 72 on the legs of the loop, as shown in Fig. 11, I can obtain a differential relay for the balanced protection of parallel lines, differential protection of transformers, generators, etc., and the comparison of phase currents and/or phase voltages. In this case the difference between the fluxes of the two windings would flow across the air gap and in the polar projection 4 and coact with the flux circulating in the loop 101 and the tie member 2. Consequently, the torque on the ring 6 will be dependent on the product of the fluxes $\phi_D$ and $\phi_S$ and a function of the phase angle $\beta$ between them or $\phi_D \phi_S f(\beta)$, where $\phi_D$ and $\phi_S$ represent respectively the flux difference and the smaller flux.

Figure 12:
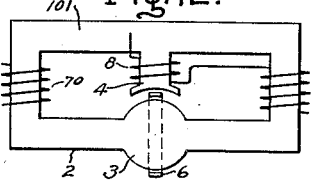

In the embodiment of my invention shown in Fig. 12, one winding 8 is located in part on the polar projection 4 and in part on one of the legs of the loop while the other winding 70 is located on the other leg. Assuming now that the windings 8 and 70 are energized by line current and voltage respectively, then the torque on the ring 6 is dependent on $$I[I-E \cos (\phi-\theta)] = I_2 - EI \cos (\phi-\theta),$$

since the flux through the ring is dependent on $I - E \cos (\phi-\theta)$ and the flux cutting the ring is dependent on I. This modification of my invention thus provides an arrangement for obtaining an operating force dependent on the square of one quantity and the product of this quantity and another quantity and a function of the phase angle between them.

Figure 13:
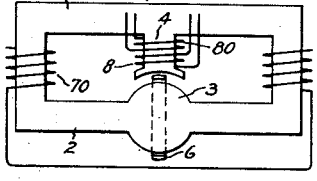

In the embodiment of my invention shown in Fig. 13, the polar projection 4 carries two windings 8 and 80 while the winding 70 is on the legs of the loop 101. Assuming that the windings 8 and 80 are energized by two electric quantities, such as currents $I_1$ and $I_2$, either for cumulative or opposing fluxes and that the winding 70 is energized by a voltage E, then the torque on the ring 6 is dependent on $E(I_1 \pm I_2)$. If the fluxes of the windings 8 and 80 are opposed, then the ring 6 will be deflected in one direction or the other depending on which of the quantities $I_1$, $I_2$ is the greater. Thus the windings 8 and 80 may be energized in accordance with corresponding currents of two parallel lines and the winding 70 in accordance with the voltage of the bus to which the lines are connected to obtain selective directional action based on the current balance of the two lines. If one of the windings, for example 8, is energized by line current and the other two windings 80 and 70 by the line voltage, then the resultant torque is dependent on $E(E \pm I) \cos (\phi-\theta)$. This arrangement can be used as the starting unit or fault detector element of a distance relay.

Figure 14:
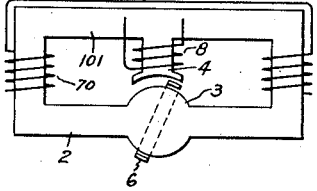

In the embodiment of my invention shown in Fig. 14 the polar projection 4 carries the winding 8 while the winding 70 is on the legs of the loop 101 and the ring 6 is displaced from the neutral position. Assuming that the windings 8 and 70 are energized by line current and voltage respectively, then the torque on the ring 6 is dependent on $I^2 - EI \cos (\phi-\theta)$. By choosing the constants of the voltage coil circuit so that $\theta$ equals 90°, the torque is $I^2 - EI \sin \phi$ and a device suitable for a reactance ohm unit for distance relays is provided. Assuming that the windings 8 and 70 are energized by line voltage and current respectively, then the torque on the ring 6 is dependent on $EI \cos (\phi-\theta) - E^2$. By choosing the constants of the voltage coil circuit so that $\theta$ equals 45° to 75°, a device suitable as a fault detector or starting unit for distance relays is provided.

In the modification of my invention shown in Fig. 15 the loop 102 is substantially U-shaped, one leg terminating in the enlargement 3 and the polar projection 4 extending from the end of the other leg toward the enlargement. The energizing winding 73, together with the ring 6 in its displaced position, provides a torque tending to turn the ring to the neutral position which in this case is reached when the ring moves to the outer end 13 of the air gap. The torque is dependent on the square of the current or voltage applied to the winding since the flux generated by the winding both threads and cuts the ring. The torque is approximately proportional to $I^2 \sin \delta$ or $E^2 \sin \delta$, where $\delta$ is the angular displacement of the ring from the neutral position. This arrangement thus provides a current or voltage relay.

Although in the embodiments of my invention heretofore described, I have omitted the showing of any contact member in connection with the closed-circuit winding or inductor ring 6, it will be obvious that any suitable contact controlling means can be actuated in accordance with the movement of the ring. One such means is shown in Fig. 18. As illustrated, this means is of the over-center spring type which is particularly well adapted to dynamometer relays embodying my invention because of their extreme sensitivity and high speed of operation. The construction comprises a pivoted contact member 14 which is connected to the inductor ring by a spring 15, the imaginary line between the spring supports being off center with respect to the pivotal axis of the contact 14 to bias the contact against stop 16, as shown in the drawings. On movement of the ring 6, the point of support of the spring thereon is moved in a direction to carry the spring across the pivotal axis of the contact 14 and thereby quickly snap the movable contact 14 into engagement with the cooperating contacts 17. It will be observed that with this arrangement a definite amount of movement of the ring is necessary before any contact movement takes place. Consequently, small oscillations or movements of the ring 6 in its attempt to follow the instantaneous values of the quantities energizing the relays are not effective to produce an erroneous contacting operation.

In Fig. 16 I have illustrated a distance relay embodying the modifications of my invention shown in Figs. 5 and 8. For the purpose of illustration, this relay is shown connected to control the trip coil circuit of a circuit breaker 18 in a three-phase circuit having phase conductors 21, 22 and 23. As shown, the relay includes a time element device 19, an ohm unit 20 and a starting unit 24. The time unit 19, as illustrated, is of the spring-wound, quick-return, ratchet type with escapement control and has an energizing winding 25 for winding its spring. This winding is connected to be energized from a control bus 26 in a circuit including the contacts 14, 17 of the starting unit 24. The timing unit 19 has a circuit controlling member 27 which cooperates with two adjustably positioned contacts 29 and 30 to provide two independently adjustable time delays.

The starting unit 24 is similar to the embodiment of my invention shown in Fig. 5. The polar projection winding 8 and the winding 7 are connected in series to be energized in accordance with the voltage between the phase conductors 21 and 22 through suitable means such as a potential transformer 31. The winding 10 is connected to be energized in accordance with the current of the phase conductor 21. The torque on the ring 6 is accordingly dependent on $$E_{21-22} I_{21} \cos(\phi - \theta) - E^2_{21-22}$$

and the contacts 14 and 17 are maintained open until the directional torque exceeds the voltage restraining torque.

Because of power surges attendant on switching and subsequent to the clearing of faults, undesired operation of relays may occur. It has been found that faults are accompanied by low voltages and low power factors, whereas surges generally involve higher voltages and power factors. In order to avoid the undesired relay operation on surges, I provide means for distinguishing between voltage and current fluctuations accompanying surges and faults. As shown in Fig. 16, this means is applied to the starting unit 24 and includes a condenser 32 connected in series with the voltage winding 8 and across this condenser are connected the voltage winding 7 and a voltage responsive means 33 having a characteristic such as to pass a current which increases disproportionately with increasing voltage. The voltage responsive means may be of any suitable type, for example the material disclosed in United States Letters Patent 1,822,742, a saturating reactor or a gaseous discharge tube which breaks down at a certain voltage, examples of which are well known to the art. The condenser 32 is proportioned with respect to the inductance of the winding 7 to form a substantially resonant circuit at the frequency of the system voltage when the voltage is above a predetermined value and to form a substantially resonant circuit with the winding 8 when the voltage applied to the windings 7 and 8 is below a predetermined value by reason of the current conducting change in the voltage responsive means 33. Obviously, at voltages near normal the current in winding 7 will be large and the current in winding 8 small. Consequently, the $E^2$ restraining torque and hence the current pick-up of the relay will be relatively high and the current in the coil 8 and hence the torque on the ring 6 suitably limited. However, at low voltages the current in the winding 7 will be reduced to a negligible value thereby correspondingly reducing the current necessary to operate the relay. The current in the winding 8 is amplified, thereby causing the sensitivity of the relay to be materially increased. Consequently, not only is the starting unit extremely sensitive to fault conditions but also it is made much less liable to operate under surge conditions. This feature is rendered still more effective by reason of the fact that the current in the winding 8 is more lagging at voltages near normal so that the sensitivity of the starting unit is less at high power factor whereas at low voltages the current in winding 8 is less lagging, which insures operation of the starting unit on faults close to the station having a high power factor due to the presence of the arc. A second voltage responsive means 34, which may be similar to the voltage responsive means 33, may be connected across the winding 8 in order to accentuate the operating features just described.

The ohm unit 20 is substantially like the modification of my invention shown in Fig. 8 in that it has the additional or auxiliary winding feature for introducing the desired $I^2$ torque. The current winding and its series related winding 12 are connected to be energized in accordance with the current in phase conductor 21 while the current winding 8 and its series related winding 12 are connected to be energized in accordance with the current in the phase conductor 22 for the purpose of giving the same ohmic indication on faults involving two or three phases. A condenser 35 and a reactor 36 connected as shown are suitably proportioned to provide the desired power factor for the circuit of the voltage winding 7.

On the occurrence of a fault to which the starting unit responds and closes its contacts 14, 17, the circuit of the time unit winding 25 is completed and at the same time the upper one of the contacts 17 of the ohm unit 20 is connected to the negative side of the bus 26. If the fault is within the distance for which the ohm unit is set to respond as determined by the setting of the first or low set tap of the resistor 37, it will close its contacts and thereby complete the circuit of the annunciator 39 and the circuit of the sealing-in relay 38 which operates to complete the trip coil circuit of the circuit breaker 18. If the fault is more distant, the ohm unit 20 does not operate but when the time unit contact 27 engages the contact 29, an auxiliary relay 40 is energized and then its contacts 41 change the resistance tap setting of the series resistance 37 of the ohm unit to a higher value. If the fault is now within the new setting of the ohm unit, the contacts 14, 17 of the ohm unit will close to effect tripping, as before. In this case, however, the relay 40, through the opening of its contacts 42, removes a short circuit from the annunciator 43 and, through the closing of its contacts 44 short-circuits the annunciator 39. If the fault is still more distant but within the range of the starting unit 24, the ohm unit 20 will not operate but tripping will be effected when the contact 27 of the timing unit engages its contact 30. At the same time, an annunciator 45 is energized while the other two annunciators 39 and 43 remain de-energized. It will be observed that the annunciators thus provide a means for selectively indicating the different time control operations of the relay and for approximately indicating the location of the fault thereby saving considerable line patrolling.

The embodiment of my invention shown in Fig. 19 is substantially the same as the arrangement shown in Fig. 16 except that instead of employing a single ohm unit 20 whose ohmic setting is automatically changed by the operation of the time unit 19 through its control of the auxiliary relay 40, I use two separate ohm units 20 and 20', each having its own fixed ohmic setting at the resistance 37. The ohm units have also been illustrated without the additional control windings 12. As illustrated, the ohm units 20 and 20' have low and high settings respectively. Also, by reason of the omission of the auxiliary relay 40, the annunciators 39 and 43 are connected directly in series with the contacts 14, 17 of their respective ohm units 20 and 20'. The operation of this embodiment of my invention will be obvious from the description of the arrangement shown in Fig. 16.

Also in Fig. 19 I have shown another voltage responsive means for providing a maximum torque under different phase relations between the circuit voltage and current depending on the magnitude of the circuit voltage. As illustrated, the voltage responsive means 33' is connected across the voltage winding 7 and may be a current limiting device whose resistance increases with increasing voltage, such for example as an iron-hydrogen resistor, examples of which are well known to the art. A condenser 32' may be connected in circuit with the voltage winding 8 and proportioned for substantial resonance therewith at line frequency. At normal voltage substantially all the current passes through winding 7 and thus provides a high $E^2$ torque while the voltage across the winding 8 is relatively small and the operating torque on the ring 6 is suitably limited. At low voltages, however, just the reverse occurs and a greater proportion of the total voltage is available across the winding 8 than before. The effect of this voltage may be somewhat amplified by the condenser 32' which also tends to improve the power factor of the circuit of the voltage winding 8 from the standpoint of burden and maximum torque angle. Consequently, the characteristics of the potential circuits in this figure are substantially like those of the arrangement shown in Fig. 16.

The arrangements shown in Figs. 16 and 19 are particularly adapted for protection against short circuits between phases. The embodiment of my invention shown in Fig. 20 provides similar protection against faults between a conductor and ground. In this figure only the A. C. circuits are shown since the arrangement is otherwise similar to Fig. 19. In both the starting unit 24 and the ohm units 20, 20', the voltage windings 7, 8 are connected to be energized in accordance with the voltage to ground of conductor 21. The current windings 9 of the ohm units and winding 10 of the starting unit are connected to be energized in accordance with the current in the phase conductor 21 while the current windings 8 of the ohm units are connected to be energized in accordance with the residual current as shown. With the correct adjustment of the tapped autotransformer 46, the torque of the ohm units is then dependent on the positive phase sequence reactance of the line between the relay and the fault and hence the distance between the relay and the fault.

While I have shown in Figs. 16, 19 and 20 a relay for only one phase, the connections of the relays in the other phases will be obvious by analogy and, generally speaking, a relay for each phase is preferable. In Fig. 20 in order to complete the connections of the current transformers I have indicated the relays in the other phases by the rectangles 47, 48. While in Figs. 16, 19 and 20 I have illustrated the inductor ring 6 as of circular form, it will be understood that this is a schematic showing and the relay is not limited to this form.

Although I have shown and described my invention in considerable detail, I do not desire to be limited to the exact arrangements shown but seek to cover by the appended claims all those modifications as fall within the true spirit and scope of my invention.

What I claim as new and desire to secure by Letters Patent of the United States, is:

1. An electroresponsive device including a magnetic loop locally enlarged, a polar projection extending from said loop toward said enlargement, a movable circuit controlling member including a closed-circuit winding around said enlargement movable in the gap between the pole face and the enlargement, a winding on said loop, a winding on said polar projection, said windings being arranged, when energized, to produce fluxes respectively through and transversely to the closed-circuit winding when this winding is in the neutral position, said closed-circuit winding being normally in a circuit controlling position displaced from its neutral position so as to be threaded by substantially all of one of said fluxes and at least a part of another of said fluxes whereby to provide two cooperating torques respectively dependent on the product of the electric quantities energizing said windings and the square of the quantity energizing one of the windings and to move the closed-circuit winding toward its neutral position when one of said fluxes changes relatively to the other.

2. An electroresponsive device including a magnetic member locally enlarged, a polar projection extending from said member toward said enlargement, a movable circuit controlling member including a closed-circuit winding around said enlargement movable in the gap between the pole face and the enlargement, winding means arranged, when energized, to produce fluxes respectively through and transversely to the closed-circuit winding when the closed-circuit winding is in the neutral position, said closed-circuit winding being normally in a circuit controlling position displaced from its neutral position so as to be threaded by substantially all of one of said fluxes and at least a part of another of said fluxes whereby to provide a torque on said closed-circuit winding proportional to a predetermined relation between the quantities energizing said winding means and to move the closed-circuit winding toward its neutral position when at least one of said fluxes changes.

3. An alternating current electroresponsive device including a magnetic loop, a magnetic member extending across said loop, a movable closed-circuit winding around said member and a plurality of windings on the magnetic structure comprising said loop and said member arranged when energized to produce a flux dependent on the sum of the quantities energizing the windings and a cooperating flux dependent upon the difference between the quantities energizing the windings whereby to exert a torque on said closed-circuit winding dependent on the product of the sum of and the difference between the electric quantities energizing the windings.

4. An alternating current electroresponsive device including a magnetic loop, a magnetic member extending across said loop, polar projections extending from said loop toward said member, a closed-circuit winding around said member movable in the gaps between said member and said projections and a plurality of windings on the magnetic structure comprising said loop, projections and member, two of said windings being arranged when energized to produce opposing fluxes and two other of said windings to produce additive fluxes whereby to exert a torque on said closed-circuit winding dependent on the product of the sum of the electric quantities energizing two of the windings and the difference between the electric quantities energizing two other windings.

5. An alternating current electroresponsive device including a rectangular magnetic loop, a magnetic member interconnecting two opposite sides of said loop and provided with a local enlargement, polar projections extending from the other sides of said loop toward said enlargement, a closed-circuit winding movable in the gaps between said enlargement and said projections, windings on said polar projections and on said interconnecting member on each side of said enlargement, two of said windings being arranged, when energized, to produce opposing fluxes and the other two to produce additive fluxes whereby to exert a torque on said closed-circuit winding dependent on the product of the sum of the electric quantities energizing two of the windings and the difference between the electric quantities energizing the other two windings.

6. An electroresponsive device including a magnetic member locally enlarged, a polar projection extending from said member toward said enlargement, a closed-circuit winding around said enlargement movable in the gap between the pole face and the enlargement, windings on said member and said polar projection for producing a torque on said closed-circuit winding dependent on the product of the electric quantities energizing the windings and another winding for changing the torque in accordance with the square of one of the electric quantities.

7. An alternating current electroresponsive device including a magnetic loop, a magnetic member extending across said loop, poles projecting from said loop toward said member, a closed-circuit winding around said member movable in the gaps between the polar projections and the member, a winding on said member and a winding on said polar projections having some of its turns on said member.

8. An electroresponsive device including a magnetic member locally enlarged in the form of a solid of revolution, a polar projection extending from said member toward said enlargement and having a pole face configuration corresponding thereto, a closed-circuit winding around said enlargement movable in the gap between the pole face and the enlargement, a winding on said core and a winding on said polar projection a portion of said polar projection winding being wound on said core.

9. An alternating current electroresponsive device including a rectangular magnetic loop, a magnetic member interconnecting two opposite sides of said loop and provided with a local cylindrical enlargement, polar projections extending from the other side of said loop toward said enlargement and having pole face configurations corresponding thereto, a closed circuit winding around said enlargement movable in the gaps between the pole faces and the enlargement, a winding on said interconnecting member, and a winding on said polar projections having some of its turns on said interconnecting member.

10. A relay including a magnetic member locally enlarged, a polar projection extending from said member toward said enlargement, circuit controlling means including a closed-circuit winding around said enlargement movable in the gap between the polar projection and the enlargement and winding means on said member arranged when energized to produce fluxes respectively through and transversely to said closed-circuit winding when the winding is in one circuit controlling position and upon a relative variation in the quantities energizing said winding means to effect movement of said closed-circuit winding to another circuit controlling position wherein the closed circuit winding is threaded by all of one of said fluxes and a part of another of said fluxes.

11. A relay including a magnetic member locally enlarged, a polar projection extending from said member toward said enlargement, circuit controlling means including a closed-circuit winding around said enlargement movable in the gap between the polar projection and the enlargement and a plurality of windings on said member arranged when energized to produce a torque on the closed-circuit winding dependent on $$K(\bar{X}-\bar{W})\bar{Y}+K_2(\bar{X}-\bar{W})\bar{Z}+K_3(\bar{Y}-\bar{Z})^2+K_4(\bar{X}-\bar{W})^2,$$

where $\bar{X}$, $\bar{W}$, $\bar{Y}$, and $\bar{Z}$ represent vectorially the electric quantities energizing the respective windings and $K_1$, $K_2$, $K_3$ and $K_4$ are constants.

12. A relay including a magnetic member having a pole intermediate its length and a magnetic portion extending transversely of said pole, circuit controlling means including a closed circuit winding around said transverse portion movable in the gap between said pole and said transverse portion and a plurality of windings on said magnetic member arranged when energized to produce a torque on the closed circuit winding dependent on $$K_1(\bar{X}-\bar{W})\bar{Y}+K_2(\bar{X}-\bar{W})\bar{Z}+K_3(\bar{Y}-\bar{Z})^2+K_4(\bar{X}-\bar{W})^2,$$

where $\bar{X}$, $\bar{W}$, $\bar{Y}$ and $\bar{Z}$ represent vectorially the electric quantities energizing the respective windings and $K_1$, $K_2$, $K_3$ and $K_4$ are constants.

ALBERT R. van C. WARRINGTON.

Certificate of Correction

Patent No. 2,000,803.  May 7, 1935.

ALBERT R. VAN C. WARRINGTON

It is hereby certified that errors appear in the printed specification of the above numbered patent requiring correction as follows: Page 2, first column, line 65, strike out the formula and insert instead $E[I_1 \cos(\phi_1-\theta)-I_2 \cos(\phi_2-\theta)]$; second column, line 14, for "$I^1$" read $I^2$; and line 34, "(Y–Z)" read $(\overline{Y}-\overline{Z})$; page 3, first column, line 53, for "$\phi$D and $\phi$S" read $\phi_D$ and $\phi_S$; line 55, for "$\phi$D and $\phi$S" read $\phi_D$ and $\phi_S$; and line 65, strike out the formula and insert instead $I[I-E \cos(\phi-\theta)]=I^2-EI \cos(\phi-\theta)$; and page 6, second column, line 6, claim 8, after "projection" insert a *comma*; and that the said Letters Patent should be read with these corrections therein that the same may conform to the record of the case in the Patent Office.

Signed and sealed this 18th day of June, A. D. 1935.

[SEAL]

LESLIE FRAZER,
*Acting Commissioner of Patents.*